US011326059B2

(12) United States Patent
Song et al.

(10) Patent No.: US 11,326,059 B2
(45) Date of Patent: May 10, 2022

(54) THERMALLY CONDUCTIVE ICE-PHOBIC COATINGS

(71) Applicants: DOW GLOBAL TECHNOLOGIES, LLC, Midland, MI (US); DOW SILICONES CORPORATION, Midland, MI (US)

(72) Inventors: Xiaomei Song, Shanghai (CN); Yu Chen, Shanghai (CN); Hongyu Chen, Shanghai (CN); Guodong Shen, Shanghai (CN); Wenjie Chen, Shanghai (CN); Jo Gunn, Chungbuk (KR); Chungmien Kuo, Taipei (TW)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 105 days.

(21) Appl. No.: 16/645,095

(22) PCT Filed: Sep. 7, 2017

(86) PCT No.: PCT/CN2017/100855
§ 371 (c)(1),
(2) Date: Mar. 6, 2020

(87) PCT Pub. No.: WO2019/047093
PCT Pub. Date: Mar. 14, 2019

(65) Prior Publication Data
US 2020/0231821 A1 Jul. 23, 2020

(51) Int. Cl.
*C09D 5/00* (2006.01)
*C09D 7/61* (2018.01)
*C09D 183/04* (2006.01)
*F25C 1/22* (2018.01)

(52) U.S. Cl.
CPC ............ *C09D 5/00* (2013.01); *C09D 7/61* (2018.01); *C09D 183/04* (2013.01); *F25C 1/22* (2013.01)

(58) Field of Classification Search
CPC .......... C09D 183/04; C09D 5/00; C09D 7/61; C09D 183/06; C09D 7/40; F25C 1/22; C08G 77/12; C08G 77/18; C08G 77/20; C08K 3/32; C08K 5/5415; C08K 5/56; C08L 83/04
See application file for complete search history.

(56) References Cited

U.S. PATENT DOCUMENTS

| | | |
|---|---|---|
| 4,774,112 A * | 9/1988 | Achtenberg ............ C09K 3/18 427/387 |
| 5,188,750 A | 2/1993 | Kogure et al. |
| 6,017,587 A | 1/2000 | Kleyer et al. |
| 6,169,066 B1 | 1/2001 | Gasmena |
| 7,399,738 B1 | 7/2008 | Serobian |
| 8,123,975 B2 | 2/2012 | Fenwick et al. |
| 8,925,626 B2 | 1/2015 | Akinaga et al. |
| 9,388,325 B2 | 7/2016 | Jones et al. |
| 9,587,871 B2 | 3/2017 | Cox et al. |
| 2004/0127636 A1 | 7/2004 | Yamamoto et al. |
| 2006/0281861 A1 | 12/2006 | Putnam |
| 2010/0213404 A1 | 8/2010 | Morita et al. |
| 2010/0266856 A1* | 10/2010 | White ................... C08J 7/0427 428/447 |
| 2010/0326699 A1 | 12/2010 | Greyling |
| 2011/0143148 A1* | 6/2011 | Butts .................. C09D 183/12 428/447 |
| 2013/0142957 A1 | 6/2013 | Connelly et al. |
| 2013/0142958 A1 | 6/2013 | Moravek et al. |
| 2013/0142959 A1 | 6/2013 | Moravek et al. |
| 2013/0291582 A1* | 11/2013 | Cox ......................... F25C 1/24 62/340 |
| 2014/0205804 A1 | 7/2014 | Jones et al. |
| 2015/0307759 A1 | 10/2015 | Bordoloi et al. |
| 2015/0329756 A1 | 11/2015 | Carlson et al. |
| 2015/0361319 A1 | 12/2015 | Gao |
| 2017/0327713 A1 | 11/2017 | Steinmann et al. |
| 2017/0349783 A1 | 12/2017 | Kirino |

FOREIGN PATENT DOCUMENTS

| | | |
|---|---|---|
| CN | 1880396 A | 12/2006 |
| CN | 1995251 A | 7/2007 |
| CN | 102127365 A | 7/2011 |
| CN | 102786817 A | 11/2012 |
| CN | 103483890 A | 1/2014 |
| CN | 104039896 A | 9/2014 |
| CN | 104212339 A | 12/2014 |
| CN | 104520392 A | 4/2015 |

(Continued)

OTHER PUBLICATIONS

International Search Report for PCT/CN2017/095146 dated Apr. 18, 2018, 4 pages.
International Search Report for PCT/CN2017/095149 dated Apr. 23, 2018, 3 pages.
International Search Report for PCT/CN2017/100855 dated Jun. 6, 2018, 4 pages.
Machine-assisted English translation of CN 1995251 obtained from https://worldwide.espacenet.com on Feb. 4, 2020, 13 pages.
Machine-assisted English translation of CN 102786817 obtained from https://worldwide.espacenet.com on Feb. 4, 2020, 9 pages.
Machine-assisted English translation of CN 103483890 obtained from https://worldwide.espacenet.com on Feb. 4, 2020, 11 pages.

(Continued)

*Primary Examiner* — Michael B Nelson
(74) *Attorney, Agent, or Firm* — Warner Norcross + Judd LLP

(57) ABSTRACT

A coating composition is disclosed. The coating composition is useful for providing a coating, e.g. on a surface of an article. The coating provides very low adhesion to ice, faster ice removal by heating power, etc. The coating composition comprises a silicone rubber, a thermal conductive filler, a reactive polysiloxane, an unsaturated group containing alkoxysilane, a catalyst, and a solvent.

9 Claims, No Drawings

(56) References Cited

FOREIGN PATENT DOCUMENTS

| | | | |
|---|---|---|---|
| CN | 104530967 | A | 4/2015 |
| CN | 105969177 | A | 9/2016 |
| CN | 106519968 | A | 3/2017 |
| EP | 1384765 | A1 | 1/2004 |
| EP | 2201068 | B1 | 6/2010 |
| EP | 2333025 | A1 | 6/2011 |
| JP | 3475128 | B2 | 12/2003 |
| JP | 2009263459 | A | 11/2009 |
| KR | 101026272 | B1 | 3/2011 |
| WO | 2002059210 | A2 | 8/2002 |
| WO | 2008074102 | A1 | 6/2008 |
| WO | 2012135187 | A1 | 10/2012 |
| WO | 2014105979 | A1 | 7/2014 |
| WO | 2015119943 | A1 | 8/2015 |
| WO | 2016043082 | A1 | 3/2016 |
| WO | 2016079278 | A1 | 5/2016 |
| WO | 2016104445 | A1 | 6/2016 |
| WO | 2016176350 | A1 | 11/2016 |

OTHER PUBLICATIONS

Machine-assisted English translation of CN 104212339 A obtained from https://worldwide.espacenet.com on Feb. 5, 2020, 16 pages.
Machine-assisted English translation of CN 104530967 obtained from https://worldwide.espacenet.com on Feb. 4, 2020, 12 pages.
Machine-assisted English translation of CN 106519968 A obtained from https://worldwide.espacenet.com on Feb. 5, 2020, 21 pages.
Machine assisted English translation of JP3475128B2 obtained from https://patents.google.com/patent on Aug. 2, 2021, 9 pages.
Machine assisted English translation of JP2009263459A obtained from https://patents.google.com/patent on Aug. 2, 2021, 11 pages.
Machine assisted English translation of KR101026272B1 obtained from https://patents.google.com/patent on Aug. 2, 2021, 6 pages.
Machine assisted English translation of CN102127365A obtained from https://patents.google.com/patent on Aug. 2, 2021, 9 pages.
Machine assisted English translation of CN105969177A obtained from https://patents.google.com/patent on Aug. 2, 2021, 9 pages.
Machine assisted English translation of WO2016043082A1, obtained from https://patents.google.com/ on Mar. 25, 2022, 26 pages.

\* cited by examiner

THERMALLY CONDUCTIVE ICE-PHOBIC COATINGS

CROSS-REFERENCE TO RELATED APPLICATIONS

This application is the National Stage of International Appl. No. PCT/CN2017/100855 filed on 7 Sep. 2017, the content of which is incorporated herein by reference.

FIELD

The present invention relates generally to a coating composition which provides a coating with very low adhesion to ice as well as a faster ice removal by heating power.

INTRODUCTION

Icing (ice build-up on an article) in a cold environment causes problems for many applications, including rotors and blades of wind turbines, power lines, telecommunications, transportations, air crafts and housewares such as refrigerators, freezer box and ice tray. Some of these applications require an easy and a faster ice removal from the surface of an article by heating. For such applications, reducing the heating time will increase efficiency of ice removal from the article. In addition to an easy and a faster ice removal by heating, a method to prevent ice build-up with a coating that has a very low ice adhesion strength (i.e. ice barely adheres to the coating) is also required. Such coating is called as "ice-phobic coating", and some prior art references disclose an ice-phobic coating on the surface of articles, for example, US2015/0361319A, WO2016/176350A, WO2015/119943A, U.S. Pat. No. 9,388,325B and US2010/0326699.

SUMMARY

The present invention provides a coating composition which shows very low adhesion to ice, as well as a faster ice removal by heating.

One aspect of the invention relates to a coating composition comprising: (A) 20 to 40 weight % of a silicone rubber, (B) 1 to 3 weight % of a thermally conductive filler, (C) 0.5 to 1 weight % of a polysiloxane having the Formula (1):

Formula (1)

wherein Me is a methyl group, $R^1$ and $R^3$ are independently an alkyl group having 1 to 4 carbon atoms, $R^2$ is a group selected from hydroxyl group, an alkoxy group having 1 to 3 carbon atoms, a vinyl group and a hydrogen atom, r is a number from 1 to 3, and m is a number from 30 to 100, (D) 0.5 to 2 weight % of a unsaturated group containing alkoxysilane, (E) 0.4 to 0.6 weight % of a catalyst, and (F) 50 to 70 weight % of a solvent.

In another aspect, the invention relates to a coating film formed from the coating composition disclosed above.

In yet another aspect, the invention relates to an article having a film at least a part of the surface of the article, wherein the film is formed from the coating composition disclosed above.

DETAILED DESCRIPTION

The coating composition of this invention comprises (A) silicone rubber, (B) a thermally conductive filler, (C) a polysiloxane which have a reactive group at the one end of the polysiloxane, (D) an unsaturated group containing alkoxysilane, (E) a catalyst and (F) a solvent.

(A) Silicone Rubber

Silicone rubber used in the coating composition is a crosslinked polysiloxane polymer and works as a matrix polymer in the coating composition. The silicone rubber is also called as 'binder resin' or 'matrix resin'. The silicone rubber is typically formed by crosslinking a trifunctional siloxane with other trifunctional siloxanes or difunctional siloxanes. In some embodiments, the silicone rubber can be formed by the crosslinking of a monomer mixture, wherein the monomer mixture is polyvinyl terminated polydimethylsiloxane, a polymethylvinyl terminated polydimethylsiloxane, a methylhydrogen siloxane and tetramethyl tetravinyl cyclotetrasiloxane. More specifically, suitable examples of the silicone rubber is dimethyl vinyl silyl terminated poly silsesquioxane. The silicone rubber is typically formulated as either 1-component or 2-component silicone composition. The silicone rubber may be cross-linked during the curing process.

The amount of silicone rubber in the coating composition is from 20 to 40 weight %, preferably from 25 to 35 weight % based on the weight of the coating composition.

(B) Thermally Conductive Filler

Thermally conductive filler used in the coating composition is normally a particle which has thermal conductive property, preferably 20 W/m·K or higher, more preferably 50 W/m·K or higher, the most preferably 100 W/m·K or higher of thermal conductivity. Examples of such thermally conductive filler include, but are not limited to, boron nitride (BN), aluminum nitride (AlN), magnesium oxide (MgO), silicon nitride ($Si_3N_4$), alumina ($Al_2O_3$), graphite, carbon nanotube, carbon fiber, carbon black and metal particles such as silver, copper, and gold.

The particle size (average particle size) of the thermally conductive filler is preferably from 0.5 to 5 micrometers, more preferably from 1 to 3 micrometers, the most preferably from 1 to 2 micrometers.

The amount of thermally conductive filler in the coating composition is from 0.1 to 5 weight %, preferably from 1 to 3 weight % based on the weight of the coating composition.

(C) Polysiloxane Having a Reactive Group

The polysiloxane used in the coating composition is represented by the following Formula (1)

Formula (1)

In Formula (1), Me is a methyl group. $R^1$ and $R^3$ are independently an alkyl group having 1 to 4 carbon atoms. Examples of $R^1$ and $R^3$ include a methyl group, an ethyl group, a n-propyl group, a sec-propyl group, n-butyl group and a tert-butyl group. Preferably, each $R^1$ and $R^3$ are a methyl group. $R^2$ is a group selected from hydroxyl group, an alkoxy group having 1 to 3 carbon atoms, a vinyl group, and a hydrogen atom. r is a number from 1 to 3. m is a number from 30 to 100, preferably from 50 to 100.

Preferably, the viscosity of the polysiloxane is from 1,000 to 20,000 centistokes. More preferably, the viscosity of the polysiloxane is from 2,000 to 10,000 centistokes.

Since the polysiloxane used in the coating composition has at least one reactive group at the one end of the polysiloxane chain, the polysiloxane may react with the matrix resin, or connect to the matrix resin through unsaturated group containing alkoxysilane. Therefore, the one-end reactive fluid can work as a kind of interface lubricant. In addition, since the polysiloxane has a straight and long chain, the polysiloxane works as a lubricant because of its chain flexibility, thus it contributes good ice-phobic property of the coating.

The amount of polysiloxane in the coating composition is from 0.1 to 2 weight %, preferably from 0.5 to 1 weight % based on the weight of the coating composition.

(D) Unsaturated Group Containing Alkoxysilane

The coating composition of the invention comprises unsaturated group containing alkoxysilane. The unsaturated group containing alkoxysilane can have the formula $R^4{}_xSi(OR^5)_{(4-x)}$, wherein x is a number from 1 to 3; alternatively x is 1. Each $R^4$ is independently a monovalent organic group with the proviso that at least one $R^4$ is an unsaturated organic group. Alternatively, the unsaturated group is an unsaturated monovalent hydrocarbon groups having 2 to 11 carbon atoms. Examples of the unsaturated organic groups for $R^4$ include, but are not limited to, vinyl, allyl, hexenyl and undecylenyl. Each $R^5$ is independently a saturated hydrocarbon group having 1 to 6 carbon atoms, alternatively 1 to 4 carbon atoms, and alternatively 1 to 2 carbon atoms, such as methyl, ethyl, propyl or butyl; alternatively methyl or ethyl. Examples of suitable unsaturated group containing alkoxysilanes include, but are not limited to, vinyltrimethoxysilane, vinyltriethoxysilane, allyltrimethoxysilane, allyltriethoxysilane, hexenyltrimethoxysilane, undecylenyltrimethoxysilane, and combinations thereof.

Not bound to the theory, but it is considered that the unsaturated group containing alkoxysilane can work as a cross-linker and/or a chain extender in the composition, and improves mechanical properties (hardness and toughness) of coating. The unsaturated group containing alkoxysilane also can react with filler such as thermally conductive filler, and improve compatibility of the filler in a coating composition. Further, the unsaturated group containing alkoxysilane also can react with the polysiloxane having a reactive group.

The amount of unsaturated group containing alkoxysilane in the coating composition is from 0.1 to 2 weight %, preferably from 0.1 to 1.5 weight %, more preferably from 0.5 to 1 weight % based on the weight of the coating composition.

(E) Catalyst

Catalyst used in the coating composition of the invention is a catalyst for hydrosilylation. Any known catalyst can be used. Examples of such catalyst include, but are not limited to, platinum compound such as $Pt(1,5-cyclooctadiene)_2$ $H_2PtCl_6$, and platinum(0)-1,3-divinyl-1,1,3,3-tetramethyldisiloxane complex.

The amount of catalyst in the coating composition should be sufficient to crosslink silicone resin, but typically is from 4 to 400 ppm, preferably from 10 to 200 ppm based on the weight of the coating composition.

(F) Solvent

The coating composition of the invention comprises a solvent. Examples of solvent include, but are not limited to, alcohols, esters, ethers, ketones, ether-alcohols, aromatic hydrocarbons, aliphatic hydrocarbons, halogenated hydrocarbons and volatile silicones. Silicone fluid with quite low viscosity can be also used as a solvent.

The amount of solvent in the coating composition is from 40 to 80 weight %, preferably from 50 to 70 weight %, more preferably from 55 to 65 weight % based on the weight of the coating composition.

(G) Silicone Fluid

The coating composition of the invention optionally comprises a silicone fluid in addition to the polysiloxane disclosed above as component (C). The silicone fluid helps to increase ice-phobic property of the coating. A silicone fluid which does not have a reactive group is preferable. Preferably, the viscosity of the silicone fluid is from 0 to 1,000 centistokes, more preferably from 100 to 350 centistokes.

The amount of the silicone fluid in the coating composition is from 0 to 15 weight %, preferably from 5 to 15 weight %, more preferably from 5 to 10 weight % based on the weight of the coating composition.

Other Ingredients

The coating composition of the invention can include other ingredients such as rheology modifier, wetting agent, filler and dispersers these are known to those skilled in the art.

Method for Forming a Coating

The coating composition can form a coating film on the surface of an article. The coating film is formed at least a part of the surface of an article by the following method which comprises two steps.

The first step is (a) contacting at least a part of the surface of the article with the coating composition disclosed above. Any article can be used. Examples of such article include, but are not limited to, rotors and blades of wind turbines, power lines, telecommunications, transportations, air crafts and housewares such as refrigerators, freezer box and ice tray. Any techniques can be used to contacting the surface of the article with the coating composition. Examples of such techniques include dipping, splaying, brushing, roll coating, spin coating and wire coating.

The second step is (b) heating the article to cure the coating composition. The major reaction is hydrosilylation from ingredients of 2-part silicone dielectric gels, which has vinyl-functional polydimethylsiloxane (PDMS), Pt catalyst, inhibitor, crosslinker SiH functional PDMS and vinyl-functional silicone resin. There is another condensation reaction of an unsaturated group containing alkoxysilane. It can react with fillers such as thermally conductive filler or a polysiloxane having a reactive group, or anchorage to substrate; the unsaturated group may also react with the silicone rubber by hydrosilylation reaction at first step. The conditions such as temperature or heating time is vary and are known to those skilled in the art, but one example is from 100 to 200 degrees C. for 0.5 to 2 hours.

Coating Film

The coating composition of the present invention can provide a coating with very low adhesion to ice as well as a faster ice removal by heating power. The concept of the invention can be applied to any kinds of silicone coatings. Especially, a soft and thick coating is preferable because such coating is required to increase its thermal conductivity (i.e. a faster ice removal by heating power). Examples of such soft and thick coatings include, but are not limited to, elastomeric silicone coating and rubbery silicone coating. The thickness of the coating film is preferably 10 to 500 micrometers, more preferably 30 to 400 micrometers.

Ice adhesion test is conducted on Instron 5565, 2712-003 with maximum pressure at 6 bar, maximum load at 1 KN and temperature range from −29° C. to 82° C. The aluminum plate with the prepared ice plaque is vertically placed in the chamber and cooled down to −20 degrees C. and keep for another 10 minutes. Then start the ice adhesion test using a push mode with the speed at 50 mm/min. The ice adhesion result can be obtained through the curve that achieved by the instrument and recorded by a software.

The ice adhesion of the coating film is preferably 10 kPa or less, more preferably 5 kPa or less, measured by the above method.

EXAMPLES

The raw materials disclosed in Table 1 were used to prepare samples in Examples and Comparative Examples.

TABLE 1

| Material type | Chemical Description | Supplier |
|---|---|---|
| A1 (including (C) and (E)) | 2 part composition for silicone dielectric gel, comprising vinyl polymer, SiH siloxane crosslinker and Pt catalyst | Dow Corning |
| A2 (including (C) and (E)) | 2 part composition for silicone elastomer, comprising vinyl polymer, vinyl terminated silicone resin, SiH siloxane crosslinker and Pt catalyst | Dow Corning |
| B1 | Boron nitride (average particle size is 2 micrometers) | Saint-Gobain Company |
| B2 | Boron nitride (average particle size is 16 micrometers) | Saint-Gobain Company |
| C1 | Bis (tri-methoxy) terminated polydimethyl siloxane (two-ends reactive fluid), Mw is less than 2,000. Viscosity is 25 cst to 40 cst. | Dow Corning |
| C2 | Tri-methoxy and tri-methyl terminated polydimethyl siloxane (one-end reactive fluid), Mw is less than 8,000. Viscosity is 130 cst | Dow Corning |
| F1 | Heptane | Wokai, Co. |
| D1 | 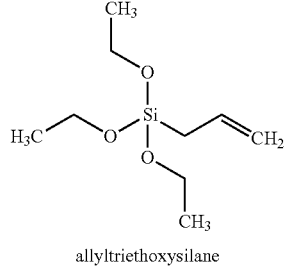 allyltriethoxysilane | Dow Corning |
| G1 | Tri-methyl terminated polydimethyl siloxane, Silicone fluid with 100 cst viscosity | Dow Corning |

Examples (References) 1 to 4

Examples for Ice-phobic Property Test

The law materials listed in Table 2 were homogeneously mixed by shaking for 30 minutes at room temperature. 0.6 ml of each solution was blade coated on aluminum panel and heated to cure the composition, at 150 degrees C. for 2 hours. Dry film thickness was analyzed by the film thickness gauge, Suffix® FN2.2, made from PHYNIX GmbH&Co.KG.

Ice adhesion testing method:

Prepared plastic caps (diameter is 4.3 cm) and aluminum plates. The plastic cap is put on the aluminum plate, then the plate with the plastic cap was cooled to form ice on the surface of the aluminum plate under −20 degrees C. for 24 hours. The plate with plastic cap was fixed by a clamp in environmental chamber set at −20 degrees C. (test sample). The cap was pushed by a metal probe in parallel direction with the plate surface, with speed of 1 mm/minutes. The maximum force (F.N) was recorded to isolate the cap from the surface of the plate. Then ice adhesion strength was calculated by the following equation: t=F/1.45 (kPa) The result are also added in Table 2.

TABLE 2

| | Examples | | | |
|---|---|---|---|---|
| | 1 | 2 | 3 | 4 |
| <PART 1> | | | | |
| A1 | 5.0 | 5.0 | 5.0 | 5.0 |
| A2 | 27.3 | 27.3 | 27.3 | 27.3 |
| F1 | 60.0 | 60.0 | 60.0 | 60.0 |
| <PART 2> | | | | |
| A1 | 5.0 | 5.0 | 5.0 | 5.0 |
| A2 | 2.7 | 2.7 | 2.7 | 2.7 |
| F1 | 20.0 | 20.0 | 20.0 | 20.0 |
| D1 | 1.0 | 1.0 | 1.0 | 1.0 |
| G1 | 10.0 | 10.0 | 10.0 | 10.0 |
| C1 | | 1.0 | | |
| C2 | | | 1.0 | 2.0 |
| film thickness (dry)/μm | 30 | 30 | 30 | 30 |
| Ice Adhesion as-prepared/kPa | 12 | 25 | 0.1 | 0.1 |

Examples 5 to 14

The raw materials listed in Table 3 were homogeneously mixed by shaking for 30 minutes at room temperature. 0.6 ml of each solution was blade coated on aluminum panel and heated to cure the composition, at 150 degrees C. for 2 hours. Dry film thickness was analyzed by the film thickness gauge, Suffix® FN2.2, made from PHYNIX GmbH&Co.KG.

Heating time testing method:

Test sample was prepared as disclosed above. The time after taking out the sample until the plastic cap automatically slip down was recorded as heating time of each sample. The results were listed in Table 3.

TABLE 3

| | Comparative Examples | | | | | | Inventive Examples | | | |
|---|---|---|---|---|---|---|---|---|---|---|
| Examples | 5 | 6 | 7 | 8 | 9 | 10 | 11 | 12 | 13 | 14 |
| <Part 1> | | | | | | | | | | |
| A1 | 5.0 | 5.0 | 5.0 | 5.0 | 5.0 | 5.0 | 5.0 | 5.0 | 5.0 | 5.0 |
| A2 | 27.3 | 27.3 | 27.3 | 27.3 | 27.3 | 27.3 | 27.3 | 27.3 | 27.3 | 27.3 |
| F1 | 60.0 | 60.0 | 60.0 | 60.0 | 60.0 | 60.0 | 60.0 | 60.0 | 60.0 | 60.0 |
| <Part 2> | | | | | | | | | | |
| A1 | 5.0 | 5.0 | 5.0 | 5.0 | 5.0 | 5.0 | 5.0 | 5.0 | 5.0 | 5.0 |
| A2 | 2.7 | 2.7 | 2.7 | 2.7 | 2.7 | 2.7 | 2.7 | 2.7 | 2.7 | 2.7 |
| F1 | 20.0 | 20.0 | 20.0 | 20.0 | 20.0 | 20.0 | 20.0 | 20.0 | 20.0 | 20.0 |
| D1 | 1.0 | 1.0 | 1.0 | 1.0 | 1.0 | 1.0 | 1.0 | 1.0 | 1.0 | 1.0 |
| G1 | 10.0 | 10.0 | 10.0 | 10.0 | 10.0 | 10.0 | 10.0 | 10.0 | 10.0 | 10.0 |
| C2 | | 1.0 | | | | | 1.0 | 1.0 | 1.0 | 1.0 |

TABLE 3-continued

|  | Comparative Examples | | | | | | Inventive Examples | | | |
|---|---|---|---|---|---|---|---|---|---|---|
| Examples | 5 | 6 | 7 | 8 | 9 | 10 | 11 | 12 | 13 | 14 |
| B1 |  |  | 1.5 |  | 4.0 |  | 1.5 | 1.5 |  |  |
| B2 |  |  |  | 1.5 |  | 4.0 |  |  | 1.5 | 1.5 |
|  | 200 | 200 | 200 | 200 | 200 | 200 | 200 | 400 | 200 | 400 |
|  | <H | <H | H | H | H | H | H | H | H | H |
|  | 55 | 51 | 53 | 55 | 36 | 19 | 2 | 4 | 10 | 8 |

What is claimed is:

1. A coating composition comprising:
(A) 20 to 40 weight % of a silicone rubber, where the silicone rubber (A) is a 1-component or 2-component silicone composition;
(B) 1 to 3 weight % of a thermal conductive filler;
(C) 0.5 to 1 weight % of a polysiloxane having the general formula (1)

  (1)

$R^1_3Si(OSiMe^2)_mOSiR^2_3$ wherein Me is a methyl group, each $R^1$ is independently an alkyl group having 1 to 4 carbon atoms, $R^2$ is an alkoxy group having 1 to 3 carbon atoms, and m is a number from 30 to 100;
(D) 0.1 to 2 weight % of an unsaturated group-containing alkoxysilane;
(E) 10 to 200 ppm of a catalyst; and
(F) 50 to 70 weight % of a solvent.

2. The coating composition of claim 1, wherein $R^2$ is a methoxy group.

3. The coating composition of claim 1, wherein the thermal conductive filler (B) is selected from the group consisting of boron nitride, aluminum oxide, aluminum nitride, magnesium oxide, silicon nitride, and carbon black.

4. The coating composition of claim 1, wherein the catalyst (E) is selected from the group consisting of chloroplatinic acid and platinum(0)-1,3-divinyl-1,1,3,3-tetramethyldisiloxane complex.

5. The coating composition of claim 1, wherein the unsaturated group-containing alkoxysilane (D) has an alkylene group having 2 to 11 carbon atoms.

6. The coating composition of claim 1, further comprising (G) a silicone fluid.

7. A coating film formed from the coating composition of claim 1.

8. An article having a surface and a film disposed on at least a portion of the surface, wherein the film is formed from the coating composition of claim 1.

9. The article of claim 8, wherein the article is selected from the group consisting of an ice-tray and inner materials of an ice freezer or a refrigerator.

* * * * *